(12) United States Patent
Lutz et al.

(10) Patent No.: US 6,259,556 B1
(45) Date of Patent: Jul. 10, 2001

(54) OPTICAL FIBRE AMPLIFIER HAVING A CONTROLLED GAIN

(75) Inventors: Dirk Lutz, Solna; Peter Blixt, Hägersten, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/282,186

(22) Filed: Mar. 31, 1999

(30) Foreign Application Priority Data

Apr. 1, 1998 (SE) .................................................. 9801159

(51) Int. Cl.[7] ............................... H01S 3/00; H04B 10/00
(52) U.S. Cl. .......................... 359/341; 359/160; 359/194; 359/349
(58) Field of Search ................................... 359/341, 349, 359/160, 194

(56) References Cited

U.S. PATENT DOCUMENTS

| | | |
|---|---|---|
| 5,117,196 | 5/1992 | Epworth et al. . |
| 5,436,760 | 7/1995 | Nakabayashi et al. . |
| 5,510,926 | 4/1996 | Bayart et al. . |
| 5,535,037 | 7/1996 | Yoneyama . |
| 5,600,481 | 2/1997 | Nakabayashi . |
| 5,861,981 * | 1/1999 | Jabr ...................................... 359/341 |
| 5,867,305 * | 2/1999 | Waarts et al. ......................... 359/341 |
| 6,067,187 * | 5/2000 | Onaka et al. ......................... 359/341 |

FOREIGN PATENT DOCUMENTS

| | | |
|---|---|---|
| 0 467 396 A2 | 1/1992 | (EP) . |
| 0 777 346 A2 | 6/1997 | (EP) . |
| 8-330649 | 12/1996 | (JP) . |

* cited by examiner

*Primary Examiner*—Stephen C. Buczinski
(74) *Attorney, Agent, or Firm*—Nixon & Vanderhye P.C.

(57) ABSTRACT

An optical fiber amplifier for WDM-signals comprises an active optical fiber pumped with pumping light from a pump source. In order to give the amplifier a constant gain for the WDM-signals irrespectively of the number of active WDM-signals an additional light source is arranged to inject, when required, extra light into the active optical fiber, at least in a portion thereof, through a power combiner. The injected light has a wavelength different from that of the WDM-channels and preferably longer so that it will not cause an amplifying or pumping effect in the active optical fiber but so that it still can be amplified in the active fiber. The light source is controlled by a signal derived from an output power measurement device so that it will inject extra light when a WDM-channel becomes inactive. The power of the extra light is thus selected to saturate the optical fiber amplifier at a constant gain irrespectively of the number of signal channels, i.e. of the total power of the input light signals. A light filter can be connected to the output end of the active optical fiber to block light having a wavelength corresponding to the wavelength of the light issued from the light source. Controlling the gain by such injection of "extra signal light" is much quicker than controlling the power of the pumping light.

14 Claims, 3 Drawing Sheets

OPTICAL FIBRE AMPLIFIER HAVING A CONTROLLED GAIN

The present invention relates to an optical amplifier based on erbium-doped fibers and also to a fiber optical network including such an optical amplifier.

BACKGROUND

Optical fibers are presently widely used for communicating information such as in large telecommunication systems, primarily owing to their large reliability, their insensitivity to electrical interference and their high capacity. Of course, there is a desire in the existing telecommunication networks to use the available optical fibers in their networks as efficiently as possible, in particular for communication over long distances, since such fibers obviously have high installation costs. By introducing wavelength division multiplexing WDM in existing communication systems using optical fibers and in new communication systems to be built a plurality of individual wavelength channels can be transmitted on the same optical fiber and thus the information transmitted over the fiber can be multiplied.

In optical fiber networks for long distance communication there may be a need for amplifying the optical signals. Such amplification can of course be achieved by a repeater built in a straight-forward way, including components converting the optical signals to electrical signals, amplifying the electrical signals and converting the electrical signals to optical signals. For WDM signals this will require one optoelectrical and one electrooptical converter per wavelength channel used in the WDM transmission and also one filter or demultiplexer for filtering out the different wavelengths in the incoming signal. This will obviously be very costly and also results in reliability problems owing the large number of components, both electronic and optical, which are required.

Another type of amplifier comprises optical fiber amplifiers based on optical fibers doped with rare-earth metals, primarily erbium-doped fiber amplifiers. Such amplifiers have great advantages when used in optical fiber systems owing to e.g. their compatibility with the optical fibers and their high gain, and they are in particular advantageous when used in wavelength multiplexed transmission systems, since they are capable of simultaneously amplifying a number of WDM channels and only require a limited amount of electronic components. The basic design of an erbium-doped fiber amplifier includes one length of an active, erbium-doped optical fiber, connected at its input end to the output of a 2-to-1 optical coupler, the coupler receiving on one of its inputs the signal to be amplified and on the other input more energetic light providing the power for amplifying the signal. This more energetic input light is called the pump light and is obtained from an optical power source, called the optical pump. The pump light has a shorter wavelength than that of the signal and is generally more energetic and is capable of lifting erbium ions from lower energy states to higher energy states in the erbium-doped fiber. Light is then generated in the fiber when the ions return to lower energy levels.

In a typical WDM system the number of used wavelength channels normally varies at random. The gain of an erbium-doped fiber amplifier operated in the conventional saturated way is dependent on the number of wavelength channels, see the diagram shown in FIG 1, owing to the total constant output power of the amplifier. In FIG. 1 the gain for a typical erbium-doped fiber amplifier is plotted as a function of wavelength of the case of only using one WDM wavelength channel, see the upper curve, and for the case of all channels being active or used, see the lower curve. The gain has a difference of at least about 10 dB for the important wavelength band of 1540–1560 nm. This means that also the gain will vary at random when the erbium-doped fiber amplifier is used in a typical WDM system used for telecommunication.

In WDM systems it is obviously important to have a constant and flat output gain in the used wavelength band, since this will allow e.g. an optimization of other components. Also, it is inefficient to use gain flattening filters, see e.g. the article by Paul F. Wysocki et al., "Broad-band Erbium-Doped Fiber Amplifier Flattened Beyond 40 nm Using Long-Period Grating Filter", IEEE Photonics Techn. Lett., Vol. 9, 10, Oct. 1997, since such filters must be designed according to the actual gain curve of the amplifier. A possible solution would be to control the pump power provided to the active fiber, but this includes disadvantages resulting from the long lifetime of excited erbium ions in the active fiber.

In the published European patent application 0 777 346 an optical amplifier used in a communication system is disclosed comprising an optical amplifying medium, i.e. a length of an erbium doped optical fiber, a pump light source and a probe light source, which sources both inject light into the amplifying medium. The probe light has a wavelength included in the amplification band of the optical amplifying medium and is preferably different from the wavelength of the signal light. Control means maintain the gain for the input signal constant. In the control the power of the probe light and the power of the input signal light are added to each other, giving the powers suitable weights in the adding operation. The result of the weighted addition is controlled to be constant by adjusting the power of the probe light.

SUMMARY

It is an object of the invention to provide an optical fiber amplifier having a gain curve which is independent of the number of active wavelength channels.

It is another object of the invention to provide an optical fiber amplifier having a gain for different wavelength channels, which for each considered channel is approximately constant in time being affected as little as possible and/or during as short time as possible by another channel becoming inactive or active.

The problem solved by the invention is thus how to provide an optical fiber amplifier used for amplifying light signals of different wavelengths and having substantially the same gain in time for all incoming light signals independently of the number of input signals present and how to achieve that the gain for wavelength channel is as little as possible affected by other channels.

When designing an erbium-doped fiber amplifier the gain of the amplifier is dimensioned for the case of all WDM-channels being active. The gain of the amplifier depends on the number of excited erbium ions and this number is approximately constant for a sufficient input pump light power, the amplifier then being operated in a saturated state. This results in an approximately constant output power of the amplifier irrespective of the number of input signals to be amplified. This in turn results in that the gain will increase when one or more WDM-channels become/becomes inactive. The number of excited erbium ions can be changed by altering the pump light power provided to the amplifier which results in a change of the gain characteristic. For a suitable control the amplifier can be made to have a substantially constant gain independent of the number of active WDM-channels, this being a commonly used method of controlling optical fiber amplifiers. However, the response time of such a control can be too long, as indicated above, since excited erbium ions in an active fiber have too long lifetimes, of about 10 ms.

Instead, in the optical fiber amplifier the switched-off channel or channels can be replaced with a dummy or idling channel having a wavelength outside the wavelength band used by the WDM-channels or generally having a wavelength different from those used the WDM-channels such as at wavelength between two wavelength bands. In practical cases the wavelength used for the idling channel can be a wavelength larger than the wavelength band used for signal transmission, such as larger than the commonly used wavelength band around 1530–1550 nm. A laser diode supplying the idling wavelength channel can be rapidly controlled to modify its output power so that the output of the total amplifier is kept substantially constant what results in better response times and more constant gain than what is possible to achieve by controlling the input pump power.

Thus generally, an optical fiber amplifier for WDM-signals, i.e. light signals of distinct wavelength channels usually included in a wavelength band or wavelength region, comprises an active optical fiber of the type which is doped with a rare-earth metal. The active fiber length is pumped with pumping light from a pump source such as a laser diode. In order to give the amplifier a constant gain for the WDM-signals irrespectively of the number of active WDM-signals an additional light source is arranged to inject, when required, i.e. when one or more WDM-signals become inactive, extra light into the active optical fiber to replace the failing input light power. The extra injection can be made in only a portion of the active fiber length and then in a last portion or end portion thereof, which is located close to the output end of the active fiber length. The injection is made through some kind of power combiner connected at the intended position in the active fiber length. The injected light is selected not to interfere with the propagation of signal light in the active fiber. It thus has a wavelength different from that of each of the WDM-channels. Furthermore the wavelength is preferably longer than the wavelengths of all of the signal light, so that it will not cause an amplifying or pumping effect in the active optical fiber. However, the wavelength is selected so that it still can be amplified in the active fiber. The light source is controlled by a signal derived from an output power measurement device so that it will inject extra light when a WDM-channel becomes inactive. The power of the extra light is thus selected to saturate the optical fiber amplifier which will give it a constant gain irrespectively of the number of signal channels, i.e. of the power of the input light signals. A light filter is preferably connected to the active optical fiber to block the extra injected light from propagating through more than the intended portion of the active fiber.

Thus, an optical fiber amplifier intended for amplifying WDM-signals is provided which has a gain for the different channels, which for each considered channel has been made constant in time. The gain for a considered channel is little affected, during a very short time, by another channel becoming inactive or active. When another wavelength channel becomes inactive or active, the constant gain for the considered channel is maintained with a short response or regulating time, so that there will no appreciable gain increase or gain decrease or a gain increase or gain decrease for a very short time at the instant when the other channel becomes active or inactive.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 4:
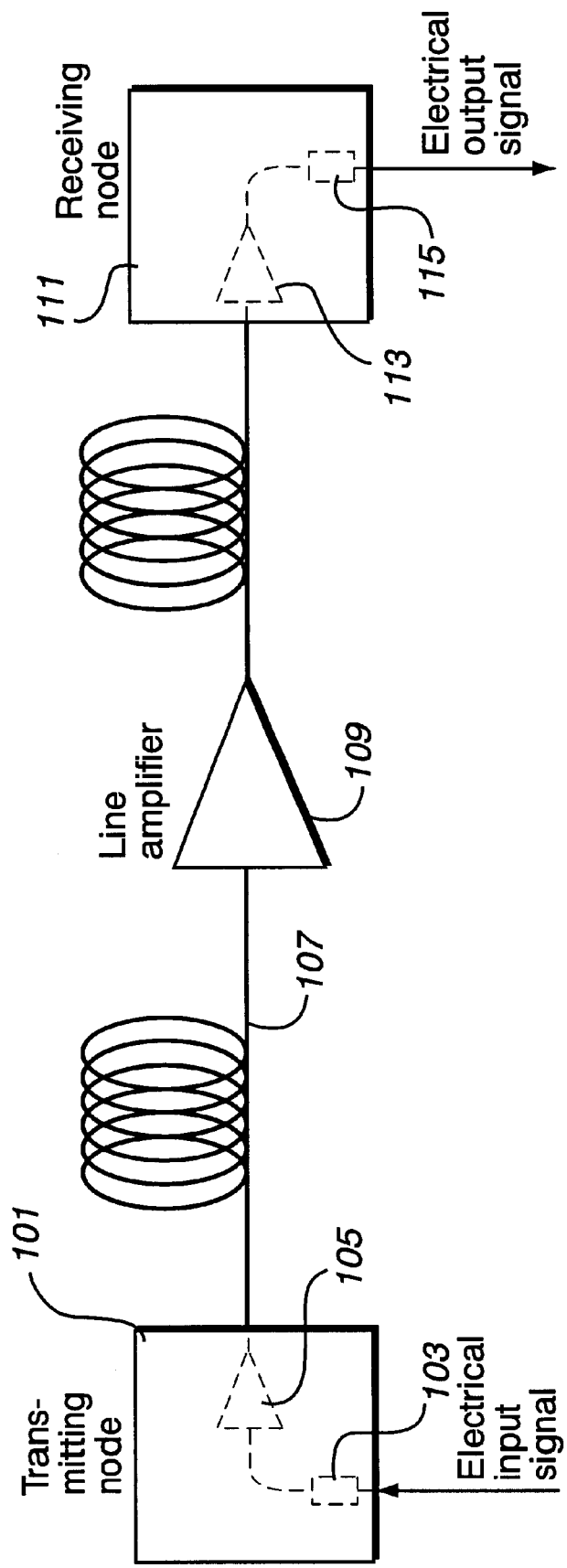
FIG. 4 is a schematic picture showing a simple fiber optical network using optical fiber amplifiers.

Optical fiber amplifiers are presently used at various positions inside fiber optical networks as illustrated in FIG. 4. Here a transmitting node 101 receives an electrical signal which is converted to a light signal by the laser 103. The light signal is amplified by a booster amplifier 105 and therefrom transmitted on a long optical fiber 107. The signal can be attenuated when propagating along the optical fiber 107 and then it has to amplified by a line amplifier 109. The light signal on the optical fiber 107 is received by a receiving node 111, in which it is first amplified by a preamplifier 113. The amplified signal is detected by a light detector 115 and therein converted to an electric signal, which is provided from the node. In such a network, the booster 105, the line amplifier 109 and the preamplifier 113 usually all comprise optical fiber amplifiers using a length of an active optical fiber as the amplifying medium or element.

Figure 2:
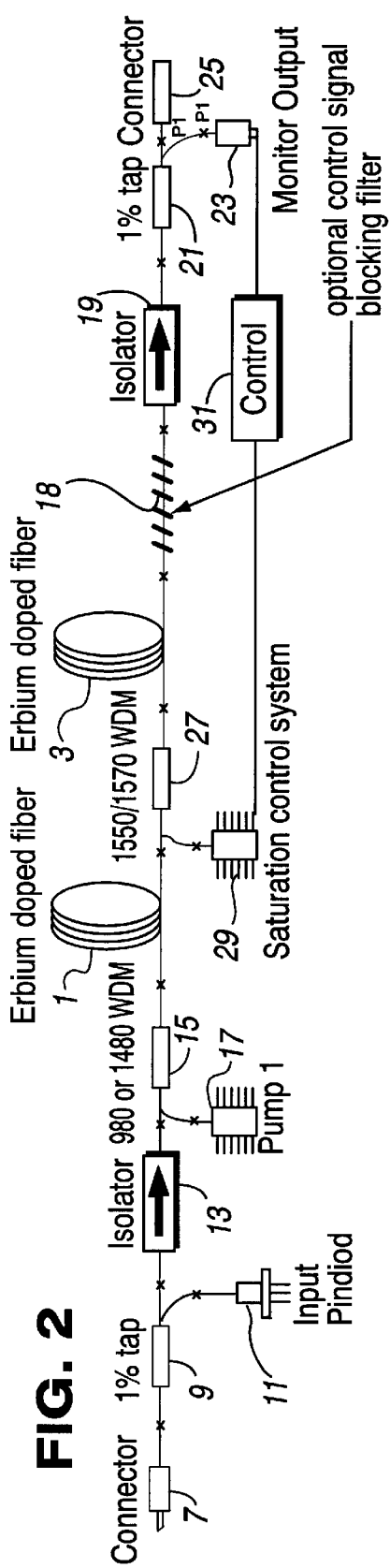
FIG. 2 is a schematic picture showing the general configuration of an optical fiber amplifier having improved gain stability.

In FIG. 2 the general configuration of an optical fiber amplifier is illustrated. The active parts thereof are two lengths 1, 3 of erbium-doped fiber, which are connected in series with each other. The first length 1 receives an optical signal from some source, not shown, arriving to a connector 7, passing on an optical fiber from the connector 7 to a power splitting device or coupled 9, tapping off a small part, e.g. 1%, of the light power on the fiber to a power measurement device such as a PIN-diode 11. The substantial part of the light power continues to an optical isolator 13 and from the optical isolator to an input of a power combiner or coupler 15, the power combiner 15 receiving on its other input pumping light power from a pump light source or first light source 17, e.g. generating light of the wavelength 980 nm or 1480 nm. The output of the power combiner 15 is connected to the input end of the first fiber length 1.

The output end of the second fiber length 3 is through an optional filter 18 connected to the input of an optical isolator 19, the output of which is connected to a power splitter coupler 21, like the power splitter 9 at the input side tapping off a small part, e.g. 1%, of the power of light on the fiber to an output power measurement device 23. The substantial part of the output power is forwarded to some destination, not shown, from the power splitter 21 through a connector 25.

Between the first and second fiber lengths 1, 3 is another power combiner or coupler 27 connected. It receives saturating light from a second light source 29 issuing light of a wavelength of e.g. the range of 1550–1570 nm and in any case of a wavelength different from and preferably larger than those of the wavelength band used for wavelength channels in WDM systems. The light issued by the second light source 29 can thus not be used for "pumping" the amplifier but will instead be amplified in the second length 3 of active fiber and then filtered away by the optional filter 18 which for instance can be a long-period grating filter, see e.g. A. Vengsarkar, "Long-period fiber gratings", in Conf. Optical Fiber Communications, 1996 Tech. Dig. Ser. Washington DC: Opt. Soc. Amer. 1996, Vol. 2, pp. 269–270, paper ThP4.

An erbium-doped fiber amplifier is usually operated in a saturated state, in which it has an approximately constant output power independent of the input power, provided that the input pump power is sufficient. When designing an erbium-doped fiber amplifier the gain of the amplifier has to be dimensioned to have a desired magnitude or equivalently for an amplifier operated in a saturated state so that the output power of the amplifier is the desired one. Then the case must be considered, in which all WDM-channels are active, i.e. that light of the wavelengths of all WDM-channels is forwarded to the input end of the amplifier. The gain of a typical optical fiber amplifier for that case is illustrated by the lower curve in the diagram of FIG. 1. If one or more channels are not used, the input power will decrease, the output power is about constant resulting in that the gain will increase. The case of having all channels active or used thus results in the lowest gain curve. The effect resulting from channels becoming inactive is illustrated by the upper curve of FIG. 1 showing the gain for the case where only one WDM-channel is used or is active.

Figure 1:
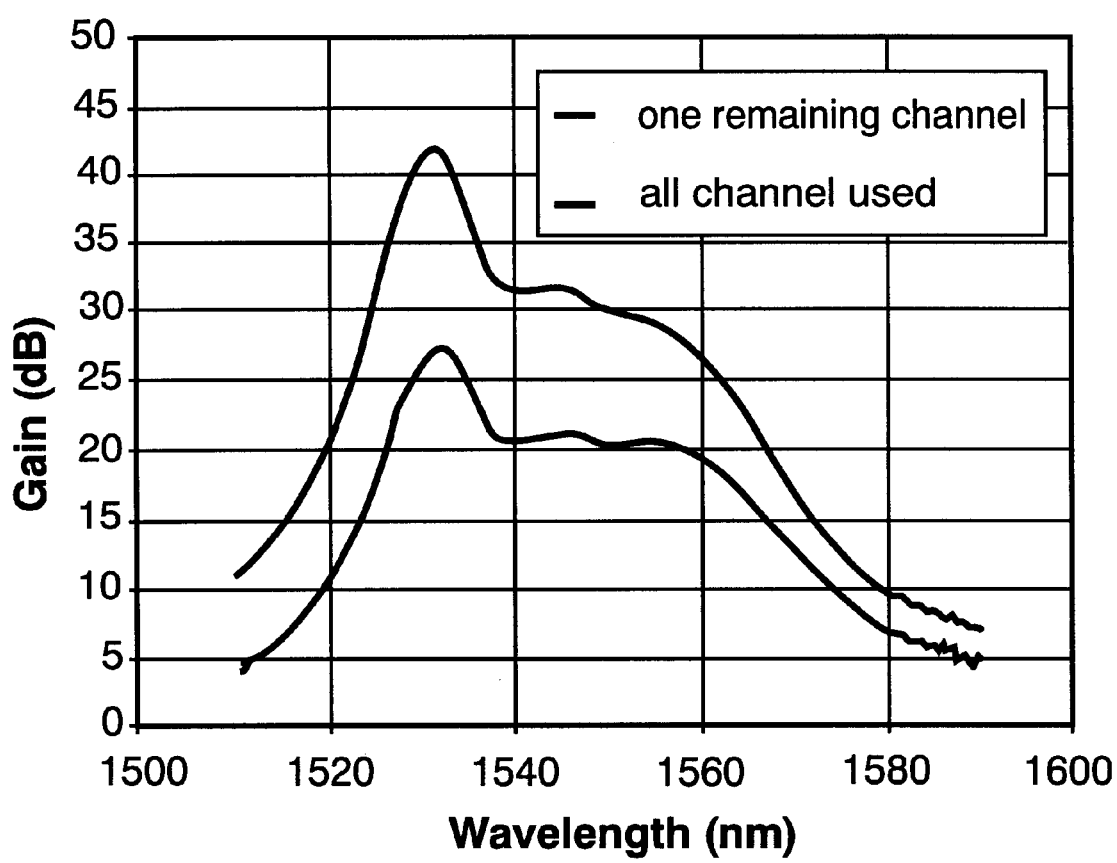
FIG. 1 is a diagram of the gain as a function of the wavelength for an optical fiber amplifier according to prior art.

In the case in which there is at least one inactive channel the light generated by the laser 29 replaces the input light corresponding to the not used channels in order to keep the gain constant, not allowing it to increase in the way illustrated by the curves of FIG. 1. The laser diode 29 is thus controlled accordingly, this being possible by the fact that the saturating signal power is correlated to the optical output power of the amplifier. The output power can be determined by an electrical circuit, such as the control unit 31 shown in FIG. 2, from the signals received from the output measurement 23 and indicating the optical output power.

Hence, in the case of all channels being active the optical output power of the saturating laser 29 is controlled to be equal to zero. In the case where a WDM-channel is not active, the saturating laser 29 is controlled to replace the light power of this wavelength channel and to generate a similar population inversion in the active fiber, see D. M. Baney and J. Stimple, "WDM EDFA Gain Characterization with a Reduced Set of Saturating Channels", IEEE Photonics Technology Letters, Vol. 8, No. 12, Dec. 1996, pp. 1615–1617.

The second light source 29 is thus all the time controlled to vary the intensity of its issued light depending on a control signal derived from the output signal of the power measurement device 23 at the output side. This power measurement device is designed to in some way measure the output power and in particular it can be designed to measure the presence and absence of all the WDM-channels which the amplifier is intended to amplify. This can be done for instance by using pilot tones, see the published European patent application No. 0 637 148 A1. Then there is an electronic control unit 31 connected to receive measurement signals from the output power detector 23 and to send a control signal to the second light source 29 for controlling the output power thereof to provide a saturating light power.

The first fiber length 1 can possibly have zero length, so that it is completely omitted. Then the light issued by second light source will travel through all of the active fiber to be amplified therein. It is also possible to connect the power combiner 27 used for injecting light issued by the second light source 29 before the combiner 15 which injects light from the pump source 17. For these alternative embodiments there will be an added insertion loss of the wavelength corresponding to that issued by the second light source 29 resulting in a higher total noise figure.

Figure 3:
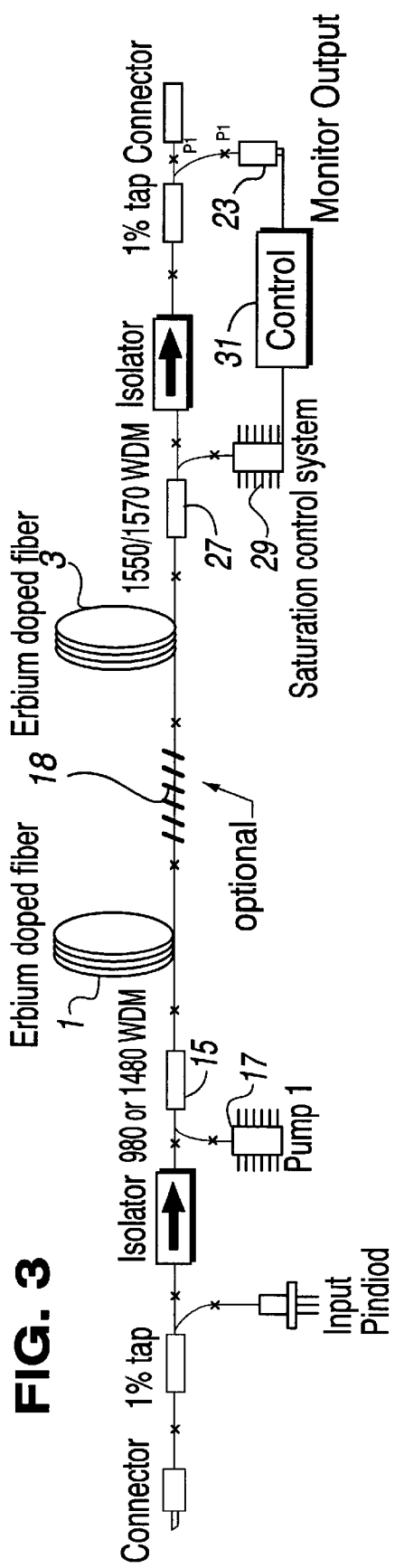
FIG. 3 is a schematic picture showing the general configuration of an alternative design of an optical fiber amplifier having improved gain stability.

Another possible embodiment, see FIG. 3, includes that the extra light from the second light source 29 is injected into the total active fiber length to propagate in a backward direction. Then the power combiner/splitter 27 is connected to the output end of the second active fiber length 3. The optional filter 18 is connected between the two filter lengths 1, 3 in order to remove light having a wavelength corresponding to that of the light produced by the second light source 29.

The amplifiers described above are primarily intended for amplifying light signals of the electromagnetic single mode type. This implies that all components used should not affect the electromagnetic modes of the light, both of the signal light and of the pump light. The components, in particular the optical power combiner 15 and the optional filter 18, should then also be designed for transmitting light of the respective wavelengths of signal light and of pump light in single mode.

Thus, an optical fiber amplifier to be used for amplifying WDM-signals such as in WDM-networks has been described herein providing a substantially constant gain for the WDM-channels used independently of the actual number of channels used and having a short control or regulating time when a WDM-channel becomes inactive or active.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An optical fiber amplifier for amplifying light signals within a wavelength band, the optical fiber amplifier comprising:

an active optical fiber having an input end adapted to receive light signals to be amplified having wavelengths in a wavelength region included in the wavelength band and an output end adapted to forward the light signals amplified during the propagation thereof in the active optical fiber by gain factors specific to the wavelengths of the light signals;

a pump source connected to inject pumping light into the active optical fiber;

an output power measurement device connected to the output end of the active optical fiber for measuring the power of light having wavelengths within the wavelength region at the output end;

a light source for injecting light into the active optical fiber, the injected light having a wavelength outside the wavelength region but within the wavelength band and selected not to be capable of causing an amplifying or pumping effect in the active optical fiber and selected to be capable of being amplified by the optical fiber amplifier; and wherein the light source is connected to the output power measurement device in order to control the intensity of the injected light injected by the light source in accordance with the measured power of light conducted by said output power measurement device to maintain the gain factors constant.

2. The optical fiber amplifier of claim 1 arranged to amplify the light signals of signal channels having distinct wavelengths in the wavelength region, wherein the light source is so connected that the power of the light injected by the light source saturates the optical fiber amplifier at a constant gain irrespectively of the number of signal channels and/or irrespectively of the total power of the input light signals.

3. The optical fiber amplifier of claim 1, wherein the active optical fiber is divided into two portions, a first portion having an input end receiving the light signals to be amplified and a second portion having an output end from which the amplified light signals are delivered, the light source being arranged to inject light into only the second portion.

4. The optical fiber amplifier of claim 3 further comprising a light combining device connected between the first and second portions to receive light from the light source to be injected into the second portion.

5. The optical fiber amplifier of claim 4 further comprising a light filter connected to the output end of the second portion to let the light signals from the second portion through but to block light having a wavelength corresponding to the wavelength of the light issued from the light source.

6. The optical fiber amplifier of claim 3 further comprising a light splitting/combining device connected to the output end of the second portion to let light from the second portion through and to receive light from the light source to be injected into the second portion in a direction opposite the direction of the light signals.

7. The optical fiber amplifier of claim 4 further comprising a light filter connected between the first and second portion to let the light signals from the first portion through but to block light having a wavelength corresponding to the wavelength of the light issued from the light source.

8. A fiber optical network comprising at least a transmitting node and a receiving node and at least one optical fiber amplifier for amplifying light signals within a wavelength band, the at least one fiber optical amplifier comprising:

an active optical fiber having an input end adapted to receive light signals having wavelengths in a wavelength region included in the wavelength band to be amplified and an output end adapted to forward the light signals amplified during the propagation thereof in the active optical fiber by gain factors specific to the wavelengths of the light signals;

a pump source connected to inject pumping light into the active optical fiber;

an output power measurement device for measuring the power of light having wavelengths within the wavelength region after said light has been amplified in the fiber during propagation in the fiber;

a light source for injecting light into the active optical fiber, the injected light having a wavelength outside the wavelength region and selected not to be capable of causing an amplifying or pumping effect in the active optical fiber and selected to be capable of being amplified by the optical fiber amplifier;

wherein the light source of the at least one fiber optical amplifier is connected to the output power measurement device of the at least one fiber optical amplifier in order to control the intensity of the injected light to maintain the gain factors of the at least one fiber optical amplifier constant, and wherein a controller in communication with said output power measurement device and said light source controls and output of said light source as a function of input that said controller receives from said output power measurement device.

9. The fiber optical network of claim 8, wherein the at least one fiber optical amplifier is arranged to amplify light signals included in signal channels having distinct wavelengths in the wavelength region, the light source of the at least one fiber optical amplifier being so connected that the power of the light injected by the light source saturates the at least one optical fiber amplifier at a constant gain irrespectively of the number of signal channels of the at least one fiber optical amplifier and/or irrespectively of the total power of the light signals input to the at least one fiber optical amplifier.

10. The fiber optical network of claim 8, wherein the active optical fiber of the at least one fiber optical amplifier is divided into two portions, a first portion having an input end receiving the light signals to be amplified and a second portion having an output end from which the amplified light signals are delivered, the light source of the at least one fiber optical amplifier being arranged to inject light into only the second portion.

11. The fiber optical network of claim 10, wherein the at least one fiber optical amplifier further comprises a light combining device connected between the first and second portions of the active optical fiber of the at least one fiber optical amplifier to receive light from the light source of the at least one fiber optical amplifier to be injected into the second portion.

12. The fiber optical network of claim 11, wherein the at least one fiber optical amplifier further comprises a light filter connected to the output end of the second portion of the active optical fiber of the at least one fiber optical amplifier to let the light signals from the second portion through but to block light having a wavelength corresponding to the wavelength of the light issued from the light source of the at least one fiber optical amplifier.

13. The fiber optical network of claim 10, wherein the at least one fiber optical amplifier further comprises a light splitting/combining device connected to the output end of the second portion of the active optical fiber of the at least one fiber optical amplifier to let light from the second portion through and to receive light from the light source of the at least one fiber optical amplifier to be injected into the second portion in a direction opposite the direction of the light signals incoming to the at least one fiber optical amplifier.

14. The fiber optical network of claim 11, wherein the at least one fiber optical amplifier further comprises a light filter connected between the first and second portion of the active optical fiber of the at least one fiber optical amplifier to let the light signals from the first portion through but to block light having a wavelength corresponding to the wavelength of the light issued from the light source of the at least one fiber optical amplifier.

* * * * *